United States Patent
Barrell et al.

(10) Patent No.: US 11,314,433 B1
(45) Date of Patent: Apr. 26, 2022

(54) REMOTE DEDUPLICATION OF DATA IN A STORAGE SYSTEM

(71) Applicant: Seagate Technology LLC, Fremont, CA (US)

(72) Inventors: Michael Barrell, Superior, CO (US); Ian Davies, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 21 days.

(21) Appl. No.: 17/100,480

(22) Filed: Nov. 20, 2020

(51) Int. Cl.
| | | |
|---|---|---|
| G06F 12/00 | (2006.01) | |
| G06F 3/06 | (2006.01) | |
| G06F 9/50 | (2006.01) | |
| G06F 16/901 | (2019.01) | |
| G06F 11/14 | (2006.01) | |

(52) U.S. Cl.
CPC .......... *G06F 3/0641* (2013.01); *G06F 3/0608* (2013.01); *G06F 3/0683* (2013.01); *G06F 9/5005* (2013.01); *G06F 9/5077* (2013.01); *G06F 11/1446* (2013.01); *G06F 11/1451* (2013.01); *G06F 11/1453* (2013.01); *G06F 16/9014* (2019.01)

(58) Field of Classification Search
CPC .... G06F 3/0641; G06F 3/0608; G06F 3/0683; G06F 3/0646; G06F 3/0647; G06F 3/065; G06F 16/9014; G06F 9/5005; G06F 9/5077; G06F 11/1446; G06F 11/1451; G06F 11/1453
See application file for complete search history.

(56) References Cited

U.S. PATENT DOCUMENTS

| | | | |
|---|---|---|---|
| 8,407,190 B2 | 3/2013 | Prahlad et al. | |
| 8,898,120 B1 | 11/2014 | Efstathopoulos | |
| 9,495,552 B2 | 11/2016 | El-Shimi et al. | |
| 9,514,145 B2 | 12/2016 | Chhaunker et al. | |
| 9,679,040 B1 | 6/2017 | Davis et al. | |
| 9,734,156 B1 | 8/2017 | Bajpai et al. | |
| 9,785,644 B2 | 10/2017 | Lam | |
| 10,380,073 B2 | 8/2019 | Kuo | |
| 10,706,082 B1 | 7/2020 | Barrell et al. | |
| 2009/0254507 A1* | 10/2009 | Hosoya | G06F 11/1456 706/48 |
| 2010/0306412 A1 | 12/2010 | Therrien et al. | |
| 2013/0086006 A1* | 4/2013 | Colgrove | G06F 16/1752 707/692 |

* cited by examiner

*Primary Examiner* — Shawn X Gu
(74) *Attorney, Agent, or Firm* — Holzer Patel Drennan

(57) ABSTRACT

Use of a deduplication module remote from a storage system for storage of data subject to deduplication by the remote deduplication module. The storage system may generate a hash of target data and send the hash of the target data to the remote deduplication module. The remote deduplication module may access a hash database corresponding to the storage system and apply a deduplication algorithm on the hash. In turn, information regarding a deduplication result may be returned to the storage system which may either store the unique target data or update a mapping between the target data and duplicate existing data in a persistent storage of the storage device. The remote deduplication module may be executed by scalable cloud resources such that the computational resources dedicated to the deduplication module may be scaled.

26 Claims, 7 Drawing Sheets

US 11,314,433 B1

REMOTE DEDUPLICATION OF DATA IN A STORAGE SYSTEM

SUMMARY

In the present disclosure, examples of systems and methods for remote deduplication of data at a storage system are provided. The deduplication includes generating a hash of target data using a hash engine at the storage system. The target data may be associated with a write command requesting the target data be written to a local persistent storage of the storage system. In other examples, the target data may be any data targeted by the storage system for deduplication. The storage system sends the hash of the target data from a network interface module of the storage system to a remote deduplication module. By remote deduplication module, it is meant that the deduplication module is located remotely from the storage system (e.g., in operative communication via a network). In response, the storage system receives, at the network interface module of the storage system, information from the remote deduplication module comprising a deduplication result. The remote deduplication module is operative to compare the received hash of the target data to a hash database regarding data stored in the persistent storage of the storage system to generate the deduplication result. The deduplication result is one of a first indication that the target data comprises unique data not stored in the persistent storage of the storage system or a second indication that the target data comprises duplicate data duplicative of existing data in the persistent storage of the storage system. The storage system writes the target data to the memory at the storage system when the target data comprises unique data in response to receipt of the first indication. Alternatively, the storage system maps the target data to the existing data in the persistent storage of the storage system when the target data comprises duplicate data in response to receipt of the second indication, wherein the mapping is based on a map that is received from the remote deduplication module corresponding to a storage location in the persistent storage at the storage system comprising the existing data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
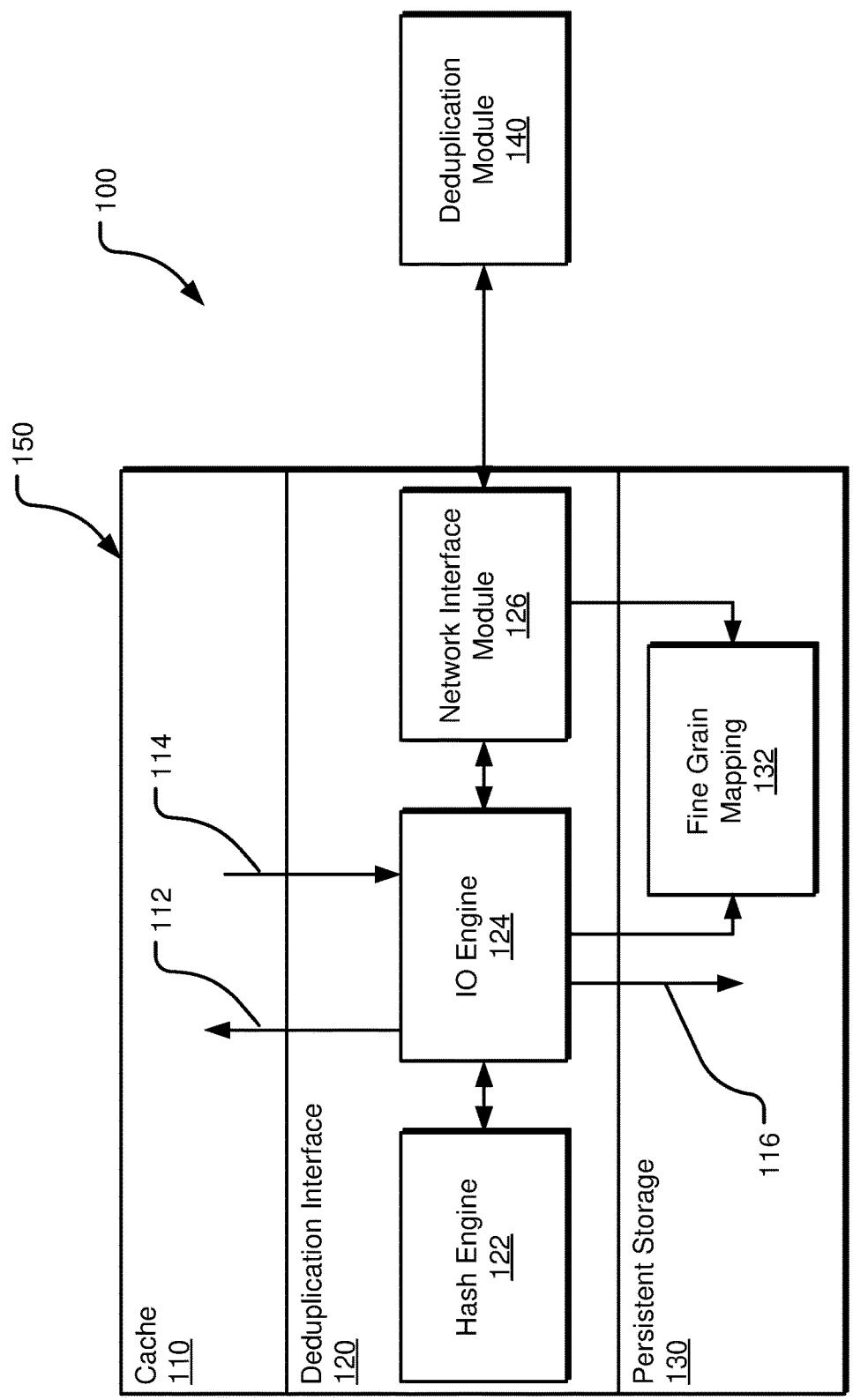
FIG. 1 depicts an example of a system for performing remote deduplication of data for a storage system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Deduplication generally refers to a process in which data that is stored or data that is to be stored in a memory device is examined to determine if identical data already exists in the memory. By performing deduplication, the amount of duplicate data resident in the memory device may be reduced, which may improve storage resource usage. Deduplication may be performed at any appropriate level of granularity in relation to the size of a given portion of data examined for duplicate data. That is, data chunks of any size may be used in deduplication to remove redundant data chunks from the memory. Rather than storing redundant chunks of data, deduplication may involve providing a mapping between existing data and target data such that a single instance of the data is stored at a physical memory location but may be mapped to multiple logical addresses.

While deduplication may provide advantages by reducing storage usage, the process for examining data for duplicates may be relatively resource intensive. That is, the process of deduplication is demanding in relation to processing and memory resources. In turn, deduplication performed with computing resources contained within the storage drive is often constrained to idle or low-usage periods to avoid overtaxing the computational resources (e.g., processor and memory) of the storage drive. For instance, RAM memory resources of at least about 128 GB per storage system are usually needed to effectively preform deduplication. Depending on the size of the data store, there are contemplated scenarios that would require 1 TB of RAM for effectively performing deduplication on a drive.

Accordingly, the present disclosure generally relates to use of a remote deduplication module for performing deduplication of data at a storage system. For instance, the remote deduplication module may be located remotely from the storage system such that the deduplication process may be performed by the external resources of the deduplication module without relying on local resources to the storage system. The remote deduplication module may be executed at a dedicated server instance remote from the storage system or may be executed in a cloud-based architecture. When using a cloud-based architecture for execution of the remote deduplication module, the resources dedicated to the deduplication module may be scalable to allow for changes (increased and/or decreases) in committed cloud resources depending on the needs of the storage system.

The use of a remote deduplication module for deduplication of data in a storage system may facilitate a number of advantages to performing deduplication locally using local storage system resources. For example, remote server or cloud-based resources may be much more economic to utilize in relation to performing deduplication of a storage system. As the remote resources dedicated to deduplication are less expensive, the remote deduplication described herein may allow for additional resources to be deployed for performing deduplication as compared to use of local storage system resources. Thus, the deduplication process may be more robust and may function more effectively in view of the additional resources that may be dedicated to deduplication.

In addition, the remote deduplication described herein may facilitate deduplication of storage systems without major modifications to the manner in which the storage drives in the storage system operate. For example, all data may still reside locally at the storage system and deduplication may be performed without any data stored or to be stored in the storage system being provided to the remote deduplication module for storage therein. Rather, the deduplication process described herein may include generation of a hash of target data to be subjected to deduplication. The hash may be a one-way hash that precludes the target data from being discerned by a party in possession of the hash. The remote deduplication module may maintain a hash database for the storage system undergoing deduplication. However, as the deduplication module may only have access to hash values, the underlying values of the data of the storage system (e.g., the data in plaintext or un-hashed format) may not be discernable to the deduplication module.

In turn, security of the data in the storage system may be preserved as the target data is not communicated directly to the remote deduplication module. Thus, any compromise of the communication channel between the storage system and the deduplication module and/or compromise of the deduplication module itself will not result in unauthorized access to the data of the storage system.

Also, because all data of the storage system is maintained locally, even when using the remote deduplication described herein, the data may be continuously available to the storage system even if communication with the deduplication module is lost. In contrast, other approaches in which data is to be stored remotely and undergoes deduplication prior to being stored remotely results in data being unavailable from the remote storage upon loss of communication with the remote storage. Therefore, the fact that all data is maintained locally at the storage system with only hashes being provided and utilized by the remote deduplication module ensures continuous availability of the data at the storage system even in the event communication with the deduplication module is lost.

Further still, the remote deduplication contemplated by the present disclosure efficiently uses communication bandwidth. For instance, the hash of the target data to undergo deduplication may have a smaller size on memory than the underlying data itself. As such, even in the event that the hash is provided with metadata (e.g., including address information for the target data at the storage system), the total communicated data (e.g., the hash and the metadata regarding the target data) may be a smaller size in memory than the underlying target data itself. Thus, rather than communicating the target data to be deduplicated, use of the hash and metadata as contemplated herein requires less bandwidth than communicating the target data.

In addition, a remote deduplication module of the present disclosure may facilitate deduplication of a plurality of independent and separate storage systems. Thus, shared computational resources of the deduplication module may be provided to each of the plurality of storage systems. However, the architecture of the system may allow the hash information from each storage system served by the deduplication module to be maintained separate such that data security may be preserved between the plurality of storage systems.

With reference to FIG. 1, an example system 100 is shown in which a remote deduplication module 140 may provide deduplication to a storage system 150. The storage system 150 may include a cache 110 that may pass a read command 112 and/or a write command 114 to an IO engine 124 of a deduplication interface 120. The deduplication interface 120 may also include a hash engine 122. In this regard, the IO engine 124 may be operative to use the hash engine 122 to generate a hash for target data at the deduplication interface 120. The target data may be the data of a write command 114 and/or existing data in a persistent storage 130 of the storage system 150. In any regard, the target data may be any appropriate size or chunk of data for use in generating the hash and performing deduplication.

The IO engine 124 may provide the hash for the target data to a network interface module 126. The IO engine 124 may also provide metadata regarding the hash of the target data such as, for example, address information for the target data (e.g., logical block address, volume number, etc.). In this regard, the network interface module 126 may communicate the hash and metadata to the remote deduplication module 140. The network interface module 126 may communicate with the remote deduplication module 140 by way of any appropriate network including, for example, a local area network, a wide area network such as the Internet, a virtual private network (VPN), or any other appropriate network interface.

Figure 2:
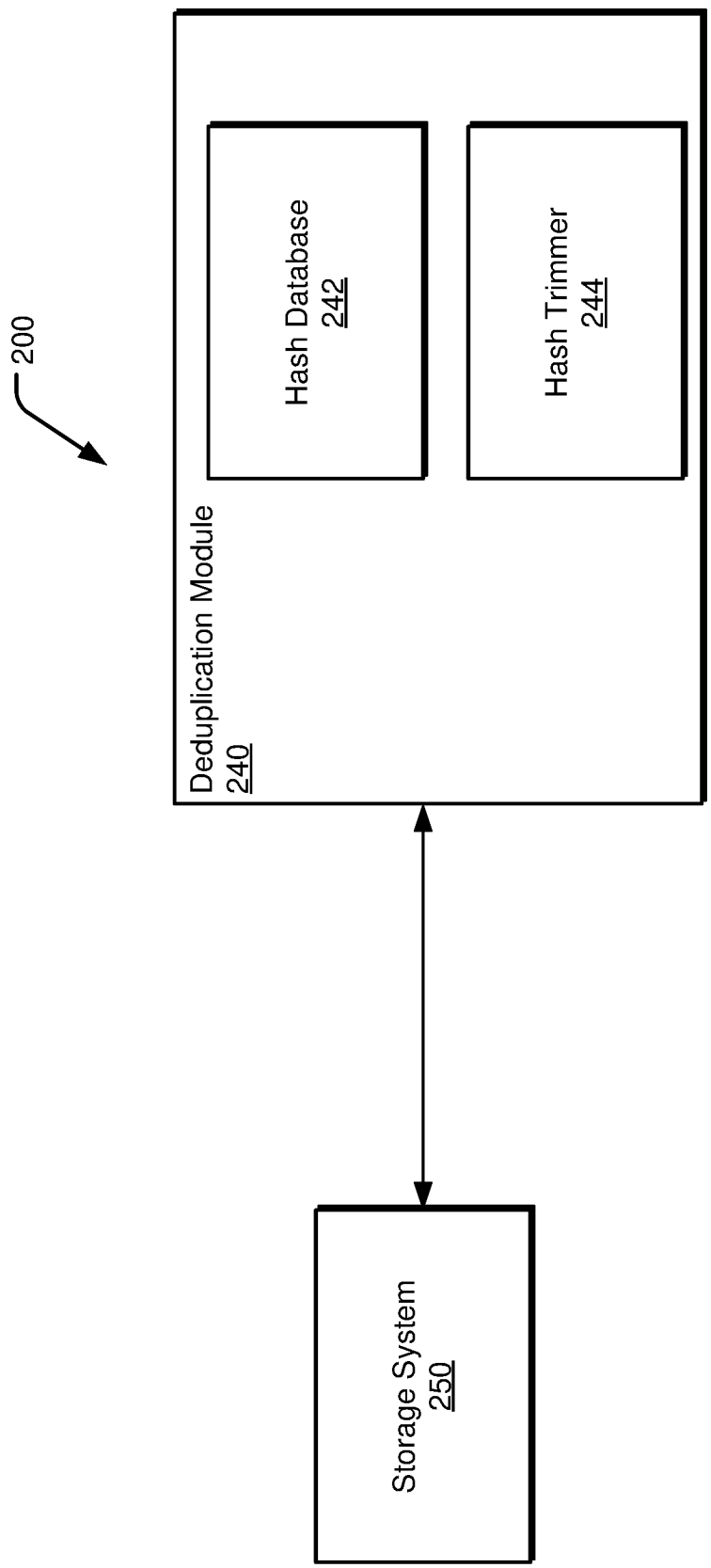
FIG. 2 depicts an example of a remote deduplication module for performing deduplication of data from a storage system.

With further reference to FIG. 2, which depicts a more detailed view of a deduplication module 240 in an example system 200, the deduplication module 240 may include a hash database 242 and a hash trimmer 244. The hash database 242 may include information regarding hash values for data stored in the persistent storage 130 of a storage system 150 from which a hash is received. In turn, the deduplication module 240 may compare a received hash to the hash database 242 to determine if the target data associated with the hash received at the deduplication module 240 is unique data or corresponds to existing data in the persistent storage 130 based on whether the hash matches an existing hash in the hash database 242.

In the event that the hash of the target data is determined by the deduplication module 240 to be unique data, the deduplication module 240 may communicate information regarding a deduplication result to the storage system 250 that indicates the target data is unique. The hash for the target data may also be stored in the hash database 242 for later use in deduplicating other target data hashes received at the deduplication module 140.

If the deduplication module 240 determines that the hash of the target data exists in the hash database 242, the deduplication module 240 may return information regarding a deduplication result to the storage system 250 that indicates the target data comprises a duplicate of existing data in the storage system 250. The hash database 242 may also contain information regarding the address in the persistent storage 130 of the storage system 250 of the existing data. Thus, the information regarding the deduplication result may include a pointer or other indication or mapping of an address in the persistent storage 130 of the storage system 250 in which the existing data corresponding to the hash of the target data is stored.

Accordingly, returning to FIG. 1, the network interface module 126 may receive the information regarding the deduplication result from the deduplication module 140.

When the information indicates that the target data is unique, the IO engine 124 may issue a write command 116 to write the unique target data to the persistent storage 130. However, when the information regarding the deduplication result indicates that the target data corresponds to existing data in the persistent storage, a mapping in a fine grain mapping 132 may be created that maps the target data to the existing data. In this regard, the fine grain mapping 132 may maintain multiple logical addresses that are mapped to a physical address that stores data. As such, rather than re-storing duplicate data upon determination that target data is a duplicate of existing data, a mapping for the target data may be created in the fine grain mapping 132 to map the target data to the existing data without storing the duplicate target data.

The deduplication module 240 may also include a hash trimmer 244. As may be appreciated, maintaining the hash database 242 may require a relatively large amount of storage. In addition, performing deduplication on a large hash database 242 may require significant computational resources. It is also recognized that deduplication may be temporally sensitive. That is, recent data is more likely to be duplicated than older data. Thus, it may be that the hash database 242 may be trimmed such that hashes for data are removed based on a temporal or periodic condition. This may be a length of time the hash has been present in the hash database without having a duplicate hash detected, a number of hash reviews since the hash has been present in the hash database without having a duplicate hash detected, or any other temporal or periodic review of the hashes stored in the hash database. For example, approaches for hash trimming that may be performed by the hash trimmer 244 may be according to U.S. Pat. No. 10,706,082, the entirety of which is incorporated by reference herein.

The use of remote deduplication as described above has been found to provide improved performance with reduced computational operation costs. For example, in traditional deduplication processing that occurs using local computational and memory resources of the storage system a system that has 64 GB of RAM may have a bandwidth of 1837 MB/s and perform 235,000 IO commands per second (IOPs). Use of a remote, cloud-based deduplication module having identical CPU and SSD resources as compared to the local resources and being connected to the storage system with a 74 MB/s network connection provided similar performance to the locally executed system by delivering 1748 MB/s bandwidth and 223,000 IOPs. Furthermore, a cloud-based remote deduplication approach in which economically available resources were utilized allowed twice the CPU and SSD resources of the local resources of the storage system to be utilized for deduplication. In this approach the cloud-based remote deduplication module was connected to the storage system using a 99 MB/s network connection that resulted in a bandwidth of 2737 MB/s for the storage system and 350,000 IOPs, demonstrating a marked increase in performance.

Figure 3:
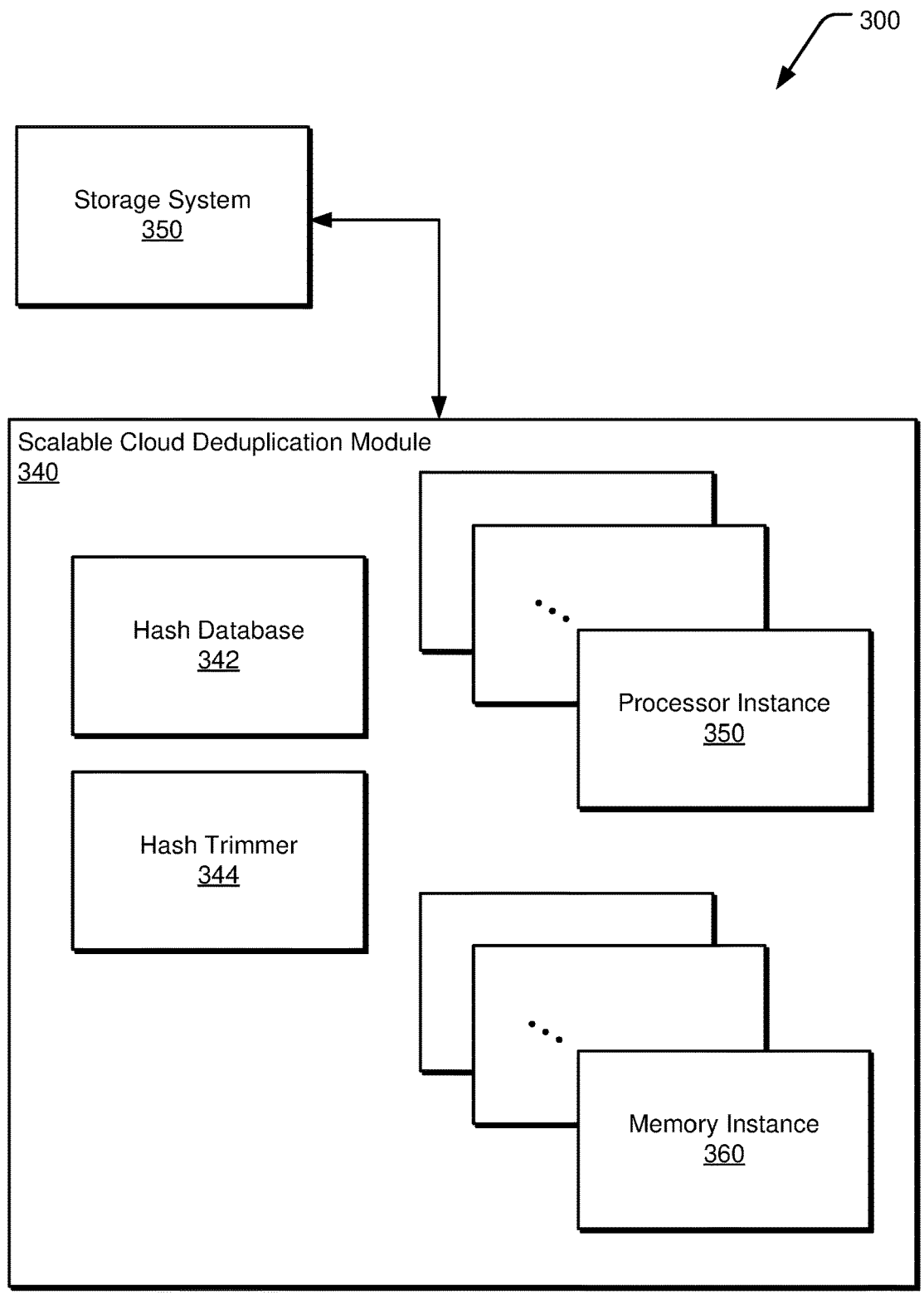
FIG. 3 depicts an example of a cloud-based deduplication module having scalable cloud resources comprising scalable processor instances and scalable memory instances.

With further reference to FIG. 3, such scalability of a remote deduplication module 340 is further discussed in a network environment 300. The environment 300 depicted in FIG. 3 includes a storage system 350 in networked communication with a scalable cloud deduplication module 340. The deduplication module 340 includes a hash database 342 and a hash trimmer 344 as described above in relation to FIG. 2. However, the scalable cloud deduplication module 340 includes variable processor instance 350 dedication and variable memory instance 360 dedication. That is, the amount of processing capability and memory resources for the scalable cloud deduplication module may be changed by allocating or deallocating scalable processor instances 350 and/or scalable memory instances 360 to the cloud deduplication module 340. In turn, the scalable cloud deduplication module 340 may have cloud resources that may be scaled with the demands of the storage system 350 to which the scalable cloud deduplication module 340 is providing deduplication services. A change in the allocated processor instances 350 and/or memory instances 360 may be initiated at the scalable cloud deduplication module 340 or may be in response to a request by the storage system 350. This may provide flexibility to an operator of the storage system 350 to vary the dedicated cloud resources to deduplication (e.g., based on conditions associated with the storage system 350 or on demand by the operator).

Figure 4:
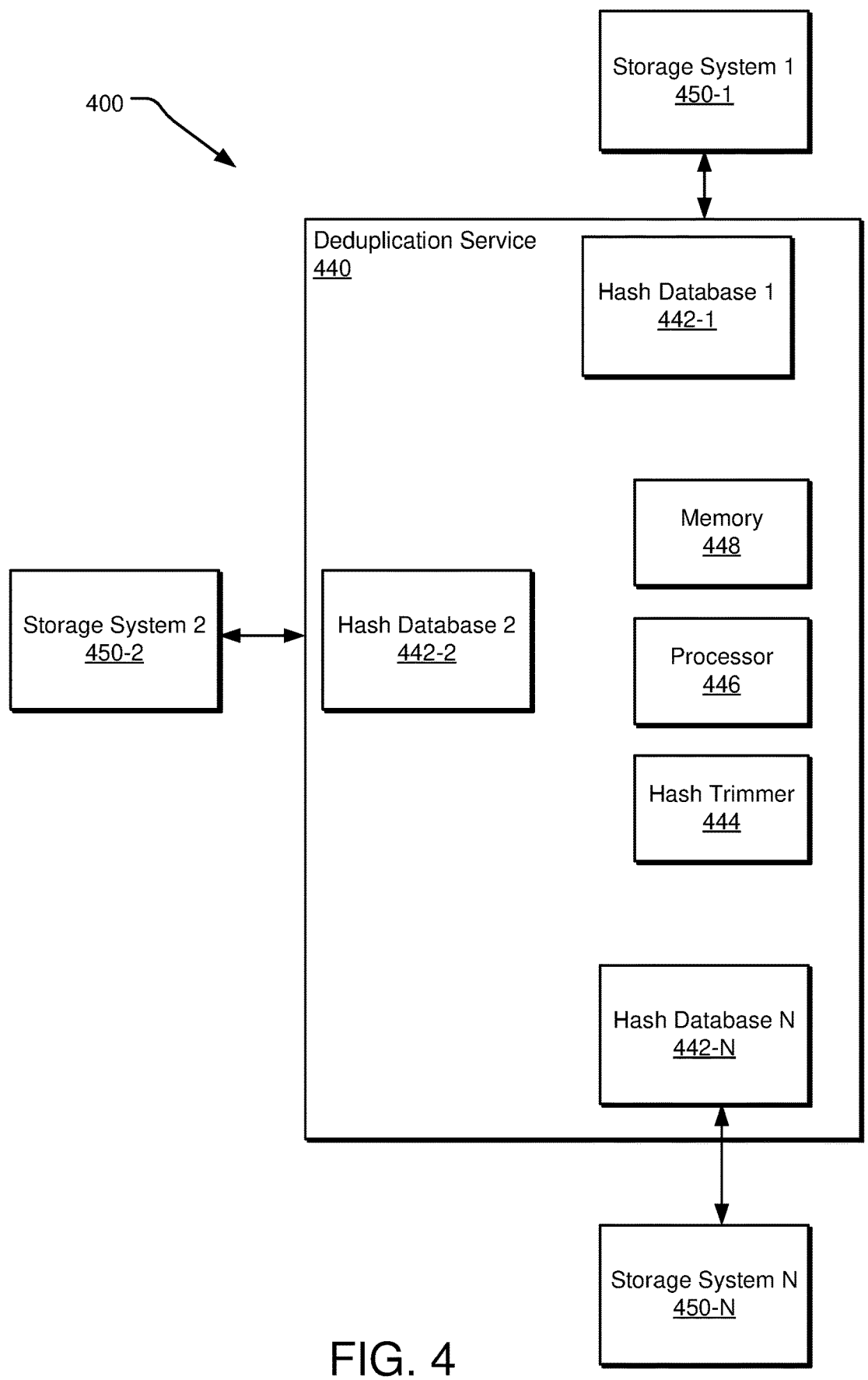
FIG. 4 depicts an example of a remote deduplication service providing deduplication services to a plurality of storage system.

FIG. 4 further depicts a system 400 in which a deduplication service 440 may provide deduplication to a plurality of storage systems 450-1 through 450-N. The deduplication service 440 may be executed by a server or may be implemented in cloud-based architecture. In any regard, the deduplication service 440 may be in networked communication with a first storage system 450-1, a second storage system 450-2, and an Nth storage system 450N, where the Nth storage system may be any number. The duplication service 440 may maintain unique hash databases 442-1 though 442-N corresponding to the storage systems 450 in operative communication with the deduplication service 440.

The deduplication service 440 may be facilitated by one or more processors 446 and one or more memories 448. As shown, the processors 446 and memories 448 may be shared resources pooled by the deduplication service 440 for providing deduplication to the storage systems 450. That is, while the deduplication service 440 may maintain separate hash databases 442 unique to each respective storage system 450 for performing deduplication with isolated access between the respective storage system 450, the deduplication service 440 may have at least some shared resources including the processors 446, memories 448, and/or hash trimmer 444.

Figure 5:
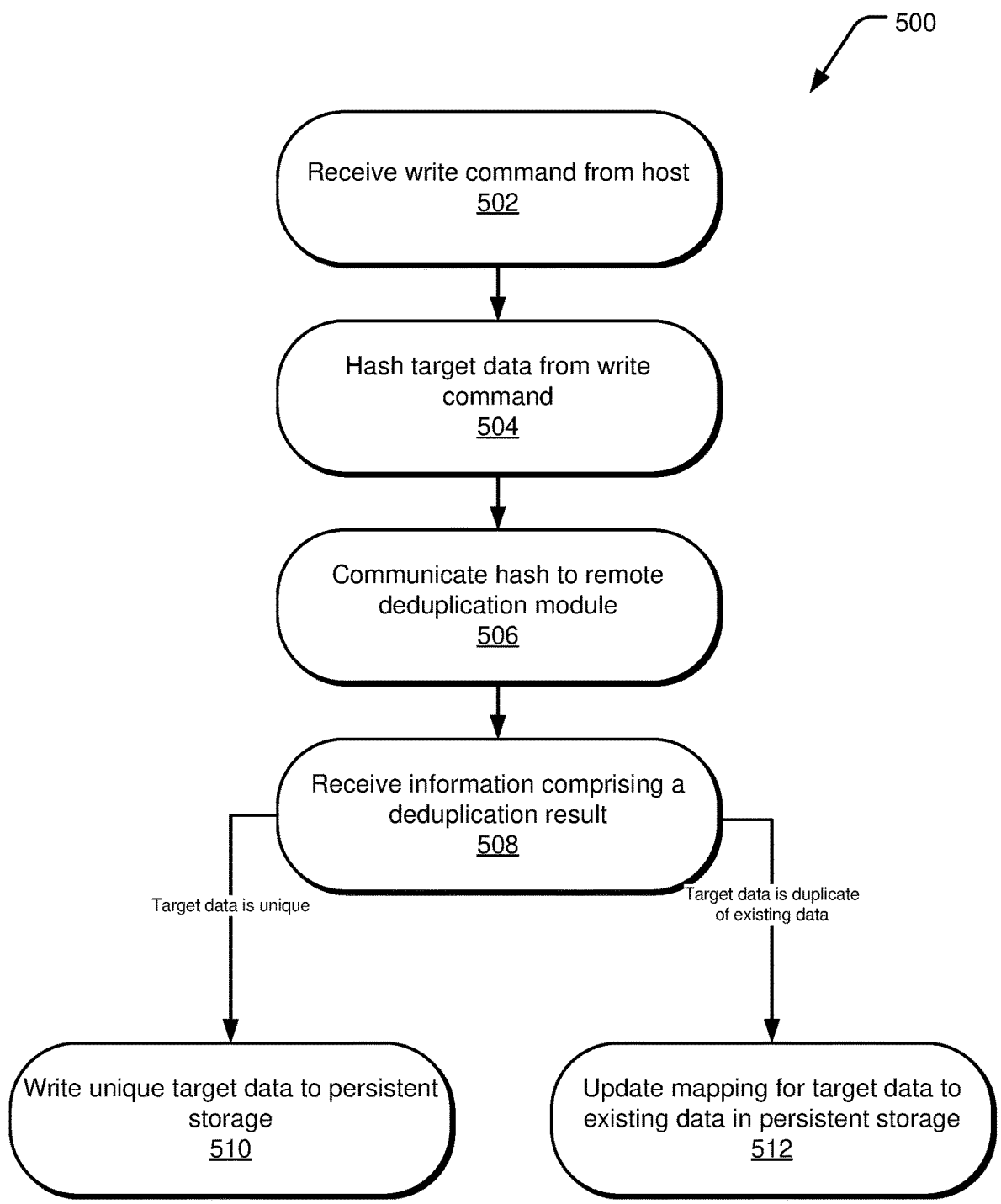
FIG. 5 depicts example operations for a storage system to provide information to a remote deduplication module for deduplication of data.

FIG. 5 depicts example operations 500 at a storage system for remote deduplication. The operations 500 include a receiving operation 502 in which a command from a host is received to write data. In this regard, the receiving operation 502 may include identifying target data associated with the data to be written in the write command that is to be subject to deduplication. While the operations 500 depict deriving target data from a write command, it may be appreciated that the target data may be identified from any data that the storage system has access to including, for example, performing deduplication on existing data stored in the persistent storage of the storage system. In addition, identification of the target data may include chunking the data of the write command into a plurality of portions of target data. That is, as the target data upon which deduplication is performed may be any appropriate size of data for different levels of granularity of deduplication, the data received in the receiving operation 502 may be chunked into a plurality of portions of target data on which deduplication is performed.

In any regard, the operations 500 may also include a hashing operation 504 in which a hash of the target data is generated. The hashing operation 504 may include applying a hashing algorithm to the target data. The hashing algorithm may be any appropriate hash algorithm including. The hashing algorithm may be a one-way hashing algorithm that results in a hash value for the target data that is unique to the target data, but that does not provide any information regarding the values of the target data that is hashed.

The operations 500 may include a communicating operation 506 in which the hash of the target data is communicated to the remote deduplication module. As described above, the communicating operation 506 may be performed using any manner of networked communication such that the hash of the target data is comminuted to the remotely located deduplication module. The communicating operation 506 may also include communicating metadata regarding the target data to the remote deduplication module. The metadata may include any appropriate information to assist in the deduplication process. For example, the metadata may include address information (e.g., logical block address, volume number, etc.) to assist in determining if the data is duplicate and/or for updating a hash database at the deduplication module.

The operations 500 may include a receiving operation 508 in which information regarding a deduplication result regarding the hash of the target data is returned. As shown in FIG. 5, when the information regarding the deduplication result indicates that the target data associated with the hash sent to the deduplication module is unique, a writing operation 510 may include writing the unique target data to the persistent storage of the storage system. While not shown, when the target data is determined to be unique, the remote deduplication module may also update a hash database with the hash for the unique target data along with an address for the information (e.g., for use in later deduplication determinations).

When the information received at the storage system indicates that the target data is duplicate data corresponding to existing data in the persistent storage, a mapping operation 512 may include updating a mapping for the target data to the target data to the existing data in the persistent storage. That is, rather than storing a duplicate copy of the target data, a fine grain mapping (e.g., as shown in FIG. 1) may be updated to map the target data (e.g., a logical address of the target data) to existing data (e.g., a physical address for the existing data). In an embodiment, when the hash database indicates that the data is a duplicate, a local controller at a storage device may read the grain indicated as a duplicate to confirm that the data is duplicative prior to updating the mapping.

Figure 6:
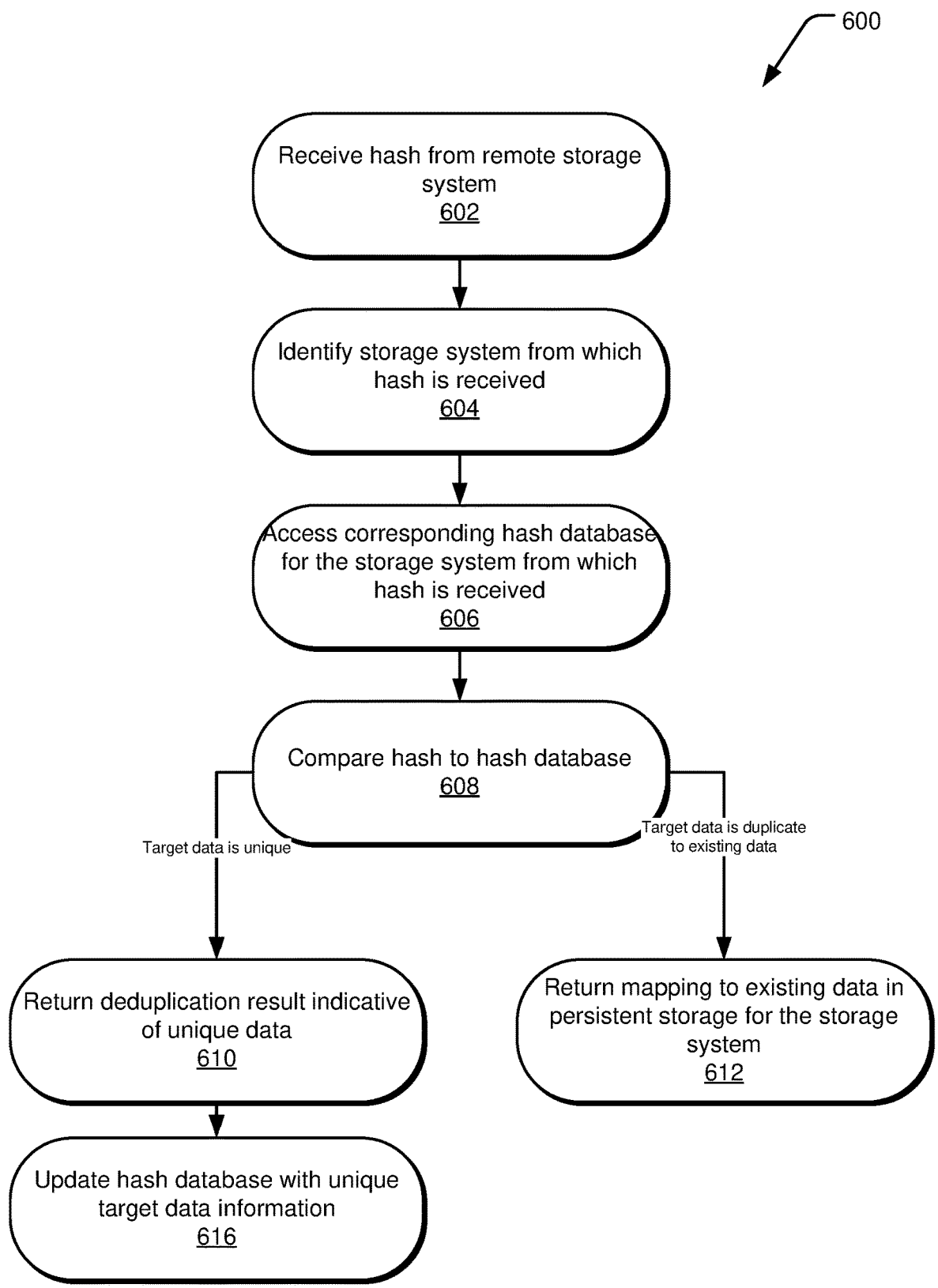
FIG. 6 depicts example operations for a remote deduplication module providing deduplication services to a plurality of storage systems.

FIG. 6 depicts example operations 600 for operation of a remote deduplication service that may provide deduplication to a plurality of storage systems. The operations 600 may include a receiving operation 602 in which a hash of target data is received from a storage system located remotely from the deduplication module. An identifying operation 604 may include identifying a storage system from which the hash was received. The identifying operation 604 may include receipt of the hash from a dedicated network connection to the storage system for purposes of identifying the storage system. In an alternative example, the storage system may be identified in metadata provided with the hash of the target data. In any regard, an accessing operation 606 includes accessing a hash database that corresponds to the storage system from which the hash is received. That is, the deduplication module may maintain a plurality of hash databases for respective different storage systems served by the deduplication module as described in relation to FIG. 4.

Once the hash database for the storage system is accessed, the operations 600 may include a comparing operation 608 in which the received hash for the target data is compared to the hash values in the hash database. This may include application of a deduplication algorithm to determine if a hash for existing data in the storage system matches the received hash for the target data. When it is determined that the hash for the target data indicates the target data is unique in response to the comparing operation 608, the operations 600 may include a response operation 610 in which information is returned to the storage system indicating that the target data is unique. In addition, the operations 600 may include an updating operation 616 in which the hash database for the storage system is updated to include the hash value for the target data determined to be unique (e.g., for later use in deduplication of data in response to receipt of a hash from the storage system).

When it is determined that the hash for the target data indicates the target data is a duplicate of existing data in response to the comparing operation 608, the operations 600 may include a response operation 612 in which information is returned to the storage system indicating that the target data is a duplicate. The response operation 612 may also return mapping data for mapping the target data corresponding to the hash to existing data in the persistent storage of the memory.

Figure 7:
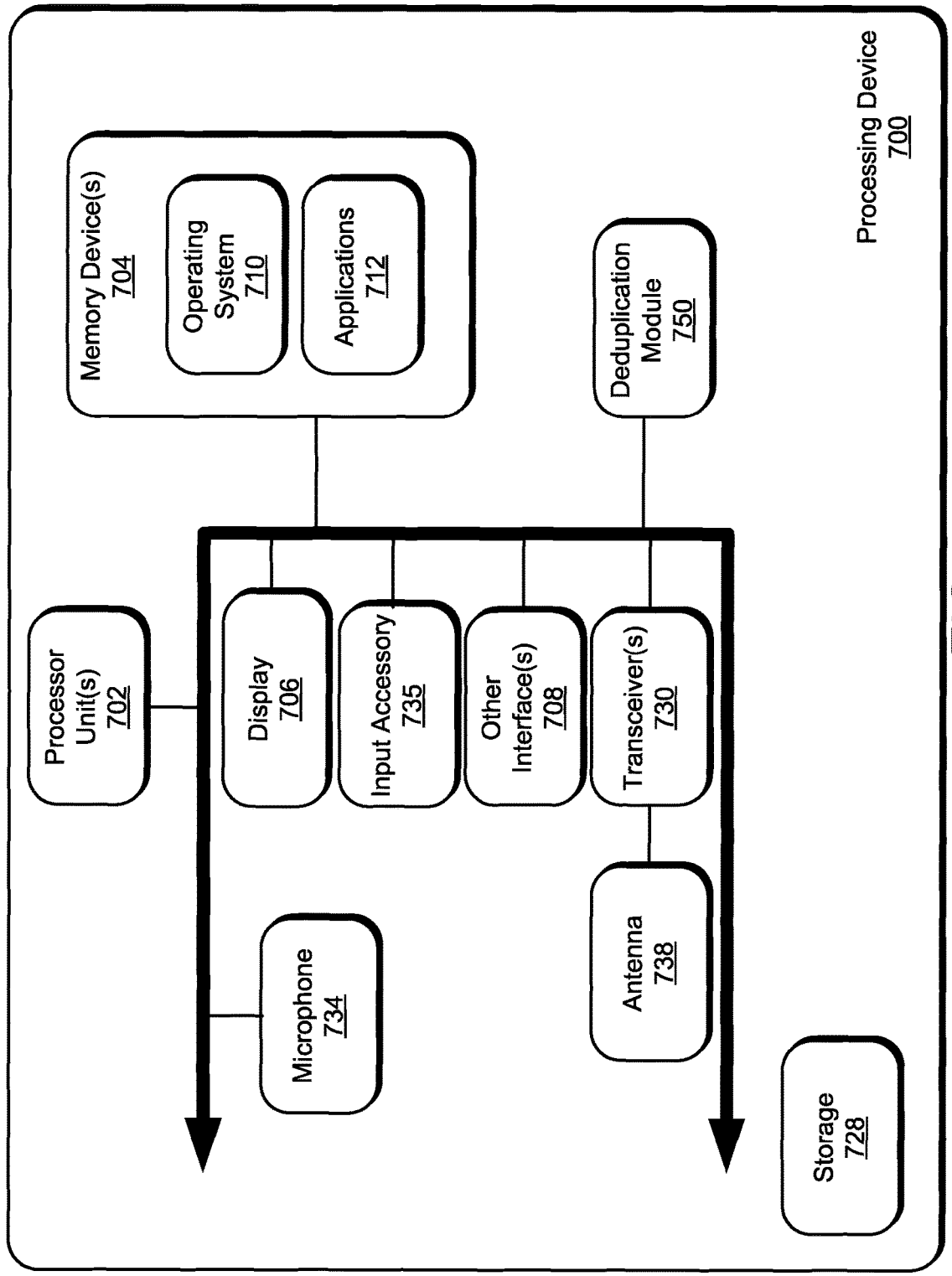
FIG. 7 depicts an example computing device capable of executing aspects of the present disclosure.

FIG. 7 illustrates an example schematic of a computing device 700 suitable for implementing aspects of the disclosed technology including a deduplication module 750 as described above. The computing device 700 includes one or more processor unit(s) 702, memory 704, a display 706, and other interfaces 708 (e.g., buttons). The memory 704 generally includes both volatile memory (e.g., RAM) and non-volatile memory (e.g., flash memory). An operating system 710, such as the Microsoft Windows® operating system, the Apple macOS operating system, or the Linux operating system, resides in the memory 704 and is executed by the processor unit(s) 702, although it should be understood that other operating systems may be employed.

One or more applications 712 are loaded in the memory 704 and executed on the operating system 710 by the processor unit(s) 702. Applications 712 may receive input from various input local devices such as a microphone 734, input accessory 735 (e.g., keypad, mouse, stylus, touchpad, joystick, instrument mounted input, or the like). Additionally, the applications 712 may receive input from one or more remote devices such as remotely-located smart devices by communicating with such devices over a wired or wireless network using more communication transceivers 730 and an antenna 738 to provide network connectivity (e.g., a mobile phone network, Wi-Fi®, Bluetooth®). The computing device 700 may also include various other components, such as a positioning system (e.g., a global positioning satellite transceiver), one or more accelerometers, one or more cameras, an audio interface (e.g., the microphone 734, an audio amplifier and speaker and/or audio jack), and storage devices 728. Other configurations may also be employed.

The computing device 700 further includes a power supply 716, which is powered by one or more batteries or other power sources and which provides power to other components of the computing device 700. The power supply 716 may also be connected to an external power source (not shown) that overrides or recharges the built-in batteries or other power sources.

In an example implementation, the computing device 700 comprises hardware and/or software embodied by instructions stored in the memory 704 and/or the storage devices 728 and processed by the processor unit(s) 702. The memory 704 may be the memory of a host device or of an accessory that couples to the host. Additionally or alternatively, the computing device 700 may comprise one or more field programmable gate arrays (FGPAs), application specific integrated circuits (ASIC), or other hardware/software/firmware capable of providing the functionality described herein.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for remote deduplication of data at a storage system. The method includes generating a hash of target data using a hash engine at the storage system and sending the hash of the target data from a network interface module of the storage system to a remote deduplication module that is located remotely from the storage system. The method also includes receiving, at the network interface module of the storage system, information from the remote deduplication module comprising a deduplication result. The remote deduplication module compares the hash of the target data to a hash database regarding data stored in the persistent storage of the storage system to generate the deduplication result. In this regard, the deduplication result comprises one of a first indication that the target data comprises unique data not stored in the persistent storage of the storage system or a second indication that the target data comprises duplicate data duplicative of existing data in the persistent storage of the storage system. The method includes writing the target data to the memory at the storage system when the target data comprises unique data in response to receipt of the first indication. Alternatively, the method includes mapping the target data to the existing data in the persistent storage of the storage system when the target data comprises duplicate data in response to receipt of the second indication. The mapping is based on a map that is received from the remote deduplication module corresponding to a storage location in the persistent storage at the storage system comprising the existing data.

Implementations may include one or more of the following features. For example, the sending may also include the network interface module sending metadata regarding the target data to the remote deduplication module. In this regard, efficiencies may be realized as the hash and the metadata collectively may have a smaller size of data than the target data.

In an example, the method may also include maintaining fine grain mapping at the storage system that maps logical addresses for data to a physical address for the data in the persistent storage of the storage system. The fine grain mapping may include a plurality of logical addresses mapped to a given physical address when the logical addresses correspond to different respective portions of the duplicate data.

In an example the remote deduplication module is executed by scalable memory and processing cloud resources. In this regard, the method may include requesting a change in an amount of the cloud resources dedicated to execution of the remote deduplication module.

In an example, the remote deduplication module receives hashes from a plurality of storage systems. The hash from a given one of the plurality of storage systems may be compared to the hash database that is unique to the given one of the plurality of storage systems from which the hash is received. The hash may be a one-way hash such that no information regarding the values of the target data is discernable from the hash value sent to the remote dedication module. In addition, it may be that no target data is stored at the remote deduplication module.

In an example, the target data may be associated with a write command requesting the target data be written to a local persistent storage of the storage system. Alternatively, the target data may be preexisting data stored in the storage system prior to generating the hash.

Another general aspect of the present disclosure includes a method for deduplication of data at a remote storage system. The method includes maintaining a hash database comprising hash values corresponding to existing data stored in a persistent storage of a remote storage system. The hash database is uniquely associated with the persistent storage of the remote storage system. The method also includes receiving a hash of target data from a network interface module of the remote storage system and performing, using a deduplication module, a comparison between the hash of the target data and the hash values of the uniquely associated hash database corresponding to the storage system from which the hash is received to generate a deduplication result based on a determination of whether the hash of the target data matches a hash value from the hash database. The method also includes sending the deduplication result to the remote storage system. The deduplication result comprises one of a first indication or a second indication. The first indication is that the target data comprises unique data not stored in the persistent storage of the storage system. The second indication is that the target data comprises duplicate data duplicative of existing data in the persistent storage of the storage system. The second indication includes a mapping to a storage location in the persistent storage at the remote storage system comprising existing data corresponding to the target data.

Implementations may include one or more of the following features. For example, the receiving may include receiving metadata regarding the target data. In any regard, the hash and the metadata may have a smaller size of data than the target data.

In an example, the hash database may include an association to a physical address of the persistent storage of the remote storage system for each hash value in the hash database. The mapping to the storage location in the persistent storage may be at least in part based on the association to the physical address for the existing data matching the target data.

In an example, the method includes executing the deduplication module using scalable memory and processing cloud resources and changing an amount of the cloud resources dedicated to the execution of the deduplication module. For example, the changing may be in response to a request received from the remote storage system.

In an example, the method may include maintaining a plurality of hash databases comprising hash values corresponding to existing data stored in persistent storage of respective ones of a plurality of remote storage systems. Each of the plurality of hash databases may be uniquely associated with corresponding persistent storage of a remote storage system. As such, the method may include receiving hashes from the plurality of remote storage systems. The hash from a given one of the plurality of storage systems is compared to the hash database that is unique to the given one of the plurality of storage systems from which the hash is received.

In an example, the hash may be a one-way hash such that no information regarding the values of the target data is discernable from a received hash value. In addition, it may be that no target data is stored at the deduplication module.

In an example, the target data is associated with a write command requesting the target data be written to a local persistent storage of the storage system. In another example, the target data may be preexisting data stored in the storage system prior to generating the hash.

Another general aspect of the present disclosure includes a system for deduplication of a storage system using a remote deduplication module. The system includes local persistent storage at the storage system storing existing data and a hash engine operative to generate a hash of target data at the storage system. The system also includes a network interface module operative to send the hash of the target data to a remote deduplication module that is located remotely from the storage system and receive information from the remote deduplication module comprising a deduplication result. The remote deduplication module compares the hash of the target data to a hash database regarding data stored in the persistent storage of the storage system to generate the deduplication result. The deduplication result comprises one of a first indication or a second indication. The first indication is that the target data comprises unique data not stored in the persistent storage of the storage system. The second indication is that the target data comprises duplicate data duplicative of existing data in the persistent storage of the storage system. The system also includes an IO engine operative to write the target data to the memory at the storage system when the target data comprises unique data in response to receipt of the first indication. The IO engine is alternatively operative to map the target data to the existing data in the persistent storage of the storage system when the target data comprises duplicate data in response to receipt of the second indication. The mapping is based on a map that is received from the remote deduplication module corresponding to a storage location in the persistent storage at the storage system comprising the existing data.

Implementations may include one or more of the following features. For example, the network interface module may be further operative to send metadata regarding the target data to the remote deduplication module. The hash and the metadata collectively may have a smaller size of data than the target data.

In an example, the system includes a fine grain mapping module at the storage system that maps logical addresses for data to a physical address for the data in the persistent storage of the storage system. The fine grain mapping may include a plurality of logical addresses mapped to a given physical address when the logical addresses correspond to different respective portions of the duplicate data.

In an example, the hash may be a one-way hash such that no information regarding the values of the target data is discernable from the hash value sent to the remote dedication module. In addition, no target data may be stored at the remote deduplication module.

In an example, the system also includes an operation optimization module operative to requesting a change in an amount of scalable memory and processing cloud resources dedicated to execution of the remote deduplication module remote.

In various examples, the target data may be associated with a write command requesting the target data be written to a local persistent storage of the storage system or the target data comprises preexisting data stored in the storage system prior to generating the hash.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for remote deduplication of data at a storage system, comprising:
   generating a hash of target data using a hash engine at the storage system;
   sending the hash of the target data from a network interface module of the storage system to a remote deduplication module that is located remotely from the storage system;
   receiving, at the network interface module of the storage system, information from the remote deduplication module comprising a deduplication result, wherein the remote deduplication module compares the hash of the target data to a hash database regarding data stored in persistent storage of the storage system to generate the deduplication result, and wherein the deduplication result comprises one of:
      a first indication that the target data comprises unique data not stored in the persistent storage of the storage system, or
      a second indication that the target data comprises duplicate data duplicative of existing data in the persistent storage of the storage system;
   writing the target data to memory at the storage system when the target data comprises unique data in response to receipt of the first indication; and
   mapping the target data to the existing data in the persistent storage of the storage system when the target data comprises duplicate data in response to receipt of the second indication, wherein the mapping is based on a map that is received from the remote deduplication module corresponding to a storage location in the persistent storage at the storage system comprising the existing data.

2. The method of claim 1, wherein the sending further comprises the network interface module sending metadata regarding the target data to the remote deduplication module, and wherein the hash and the metadata collectively comprises a smaller size of data than the target data.

3. The method of claim 1, further comprising:
   maintaining fine grain mapping at the storage system that maps logical addresses for data to a physical address for the data in the persistent storage of the storage system, wherein the fine grain mapping includes a plurality of logical addresses mapped to a given physical address when the logical addresses correspond to different respective portions of the duplicate data.

4. The method of claim 1, wherein the remote deduplication module is executed by scalable memory and processing cloud resources, and the method further comprises:
   requesting a change in an amount of the cloud resources dedicated to execution of the remote deduplication module.

5. The method of claim 1, wherein the remote deduplication module receives hashes from a plurality of storage systems, and wherein the hash from a given one of the plurality of storage systems is compared to the hash database that is unique to the given one of the plurality of storage systems from which the hash is received.

6. The method of claim 1, wherein the hash comprises a one-way hash such that no information regarding values of the target data is discernable from the hash sent to the remote deduplication module.

7. The method of claim 6, wherein no target data is stored at the remote deduplication module.

8. The method of claim 1, wherein the target data is associated with a write command requesting the target data be written to a local persistent storage of the storage system.

9. The method of claim 1, wherein the target data comprises preexisting data stored in the storage system prior to generating the hash.

10. A method for deduplication of data at a remote storage system, comprising:
    maintaining a hash database comprising hash values corresponding to existing data stored in a persistent storage of a remote storage system, wherein the hash database is uniquely associated with the persistent storage of the remote storage system;
    receiving a hash of target data from a network interface module of the remote storage system;
    performing, using a deduplication module, a comparison between the hash of the target data and the hash values of the uniquely associated hash database corresponding to the storage system from which the hash is received to generate a deduplication result based on a determination of whether the hash of the target data matches a hash value from the hash database;
    sending the deduplication result to the remote storage system, wherein the deduplication result comprises one of:
       a first indication that the target data comprises unique data not stored in the persistent storage of the storage system, or
       a second indication that the target data comprises duplicate data duplicative of existing data in the persistent storage of the storage system, wherein the second indication comprises a mapping to a storage location in the persistent storage at the remote storage system comprising existing data corresponding to the target data.

11. The method of claim 10, wherein the receiving further comprises receiving metadata regarding the target data, and wherein the hash and the metadata collectively comprises a smaller size of data than the target data.

12. The method of claim 10, wherein the hash database comprises an association to a physical address of the persistent storage of the remote storage system for each hash value in the hash database, and wherein the mapping to the storage location in the persistent storage is at least in part based on the association to the physical address for the existing data matching the target data.

13. The method of claim 10, further comprising:
    executing the deduplication module using scalable memory and processing cloud resources; and
    changing an amount of the cloud resources dedicated to the execution of the deduplication module.

14. The method of claim 13, wherein the changing is in response to a request received from the remote storage system.

15. The method of claim 10, further comprising:
maintaining a plurality of hash databases comprising hash values corresponding to existing data stored in persistent storage of respective ones of a plurality of remote storage systems, wherein each of the plurality of hash databases are uniquely associated with corresponding persistent storage of a remote storage system;
receiving hashes from the plurality of remote storage systems, wherein the hash from a given one of the plurality of storage systems is compared to the hash database that is unique to the given one of the plurality of storage systems from which the hash is received.

16. The method of claim 10, wherein the hash comprises a one-way hash such that no information regarding the values of the target data is discernable from a received hash value.

17. The method of claim 16, wherein no target data is stored at the deduplication module.

18. The method of claim 10, wherein the target data is associated with a write command requesting the target data be written to a local persistent storage of the storage system.

19. The method of claim 10, wherein the target data comprises preexisting data stored in the storage system prior to generating the hash.

20. A system for deduplication of a storage system using a remote deduplication module, comprising:
local persistent storage at the storage system storing existing data;
a hash engine operative to generate a hash of target data at the storage system;
a network interface module operative to:
send the hash of the target data to a remote deduplication module that is located remotely from the storage system, and
receive information from the remote deduplication module comprising a deduplication result, wherein the remote deduplication module compares the hash of the target data to a hash database regarding data stored in the persistent storage of the storage system to generate the deduplication result, and wherein the deduplication result comprises one of:
a first indication that the target data comprises unique data not stored in the persistent storage of the storage system, or
a second indication that the target data comprises duplicate data duplicative of existing data in the persistent storage of the storage system; and
an input/output ("IO") engine operative to:
write the target data to memory at the storage system when the target data comprises unique data in response to receipt of the first indication, and
map the target data to the existing data in the persistent storage of the storage system when the target data comprises duplicate data in response to receipt of the second indication, wherein the mapping is based on a map that is received from the remote deduplication module corresponding to a storage location in the persistent storage at the storage system comprising the existing data.

21. The system of claim 20, wherein the network interface module is further operative to send metadata regarding the target data to the remote deduplication module, and wherein the hash and the metadata collectively comprises a smaller size of data than the target data.

22. The system of claim 20, further comprising:
a fine grain mapping module at the storage system that maps logical addresses for data to a physical address for the data in the persistent storage of the storage system, wherein the fine grain mapping includes a plurality of logical addresses mapped to a given physical address when the logical addresses correspond to different respective portions of the duplicate data.

23. The system of claim 20, wherein the hash comprises a one-way hash such that no information regarding values of the target data is discernable from the hash sent to the remote deduplication module, and wherein no target data is stored at the remote deduplication module.

24. The system of claim 20, further comprising:
an operation optimization module operative to requesting a change in an amount of scalable memory and processing cloud resources dedicated to execution of the remote deduplication module remote.

25. The method of claim 20, wherein the target data is associated with a write command requesting the target data be written to the local persistent storage of the storage system.

26. The method of claim 20, wherein the target data comprises preexisting data stored in the storage system prior to generating the hash.

* * * * *